United States Patent [19]
Alamgir et al.

[11] Patent Number: 5,747,195
[45] Date of Patent: May 5, 1998

[54] CURRENT COLLECTORS FOR HIGH ENERGY DENSITY CELLS

[76] Inventors: Mohammed Alamgir; Joseph B. Kejha; Hung Chieh Shiao, all of c/o Lithium Technology Corp. 5115 Campus Dr., Plymouth Meeting, Pa. 19462

[21] Appl. No.: 642,937

[22] Filed: May 6, 1996

[51] Int. Cl.$^6$ .................................... H01M 4/70
[52] U.S. Cl. ................................. 429/235; 429/236
[58] Field of Search ........................ 429/235, 236

[56] References Cited

U.S. PATENT DOCUMENTS

| | | | |
|---|---|---|---|
| 2,251,913 | 8/1941 | Brennan | 429/236 X |
| 4,215,190 | 7/1980 | Ferrando et al. | 429/222 |
| 4,510,216 | 4/1985 | Nogami et al. | 429/101 |
| 4,960,655 | 10/1990 | Hope et al. | 429/192 |
| 5,080,963 | 1/1992 | Tatarchuk et al. | 429/235 X |
| 5,434,024 | 7/1995 | Ikeda et al. | 429/245 X |

Primary Examiner—Stephen Kalafut
Attorney, Agent, or Firm—Zachary T. Wobensmith, III

[57] ABSTRACT

Lightweight current collectors for use in electrochemical cells which are formed of a carbon or graphite fibrous net upon which a thin metallic coating is deposited upon the individual fibers providing a coating thereon, with voids between the fibers which can hold active materials if deposited therein.

10 Claims, 1 Drawing Sheet

CURRENT COLLECTORS FOR HIGH ENERGY DENSITY CELLS

BACKGROUND OF THE INVENTION

Field of the Invention

This invention is directed to lightweight current collectors for high energy density cells of the type wherein the collector has a fibrous net base of carbon or graphite with a metallic coating thereon.

DESCRIPTION OF THE PRIOR ART

Electrochemical devices such as electric batteries consist of at least an anode, a layer of electrolyte, and a cathode.

High energy density rechargeable batteries which use alkaline metals and their alloys, or insertion anodes commonly known as lithium-ion batteries, are considered to be the power sources of choice. Thin film polymer electrolyte batteries are particularly desirable because of their laminate type construction which lends itself to mass production. These batteries include current collectors which are usually metal foils or screens of nickel, copper, aluminum or stainless steel upon which the active materials are deposited. While the resultant structures provide satisfactory operation, the weight of the current collectors is a significant portion of the total weight of the battery.

As a result, the energy density of thin film polymer electrolyte batteries is dramatically lowered by the weight of the metal current collectors. Additionally it is very difficult to achieve good adhesion to the foil base with the active materials.

It has been proposed to provide a fibrous net of carbon or graphite. The fibrous net acts as a current collector and provides a medium to hold the active materials, such as disclosed in the U.S. Pat. No. to Hope et al. 4,960,655, Fernando et al. U.S. Pat. No. 4,215,190 and Nogami et al. U.S. Pat. No. 4,510,216. One of the problems encountered with carbon materials is that although they are very lightweight, they do not provide high electronic conductivity, and therefore high current discharges are adversely affected. The current collectors of the invention do not suffer from the problems of the prior art collectors, but provide both high electronic conductivity and a lightweight product.

SUMMARY OF THE INVENTION

It has now been found that current collectors for high energy density cells are available which are lightweight and have high electronic conductivity.

The current collectors are formed of a carbon or graphite fibrous net which has a coating of metal thereon, and upon which the active materials may be deposited.

The principal object of the invention is to provide current collectors for high energy density cells which are lightweight and have high electronic conductivity.

A further object of the invention is to provide current collectors of the character aforesaid which are particularly useful in thin film polymer electrolyte batteries.

A further object of the invention is to provide current collectors of the character aforesaid which are particularly suited for mass production of electrochemical cells.

A further object of the invention is to provide current collectors of the character aforesaid which improve the structural integrity of the finished product.

A further object of the invention is to provide current collectors of the character aforesaid which are inexpensive and easy to manufacture.

Other objects and advantageous features of the invention will become apparent from the description and claims.

DESCRIPTION OF THE DRAWINGS

The nature and characteristic features of the invention will be more readily understood from the following description taken in connection with the accompanying drawing forming part hereof in which:

The FIGURE is a vertical sectional view of a battery constructed in accordance with the invention.

Figure 1:
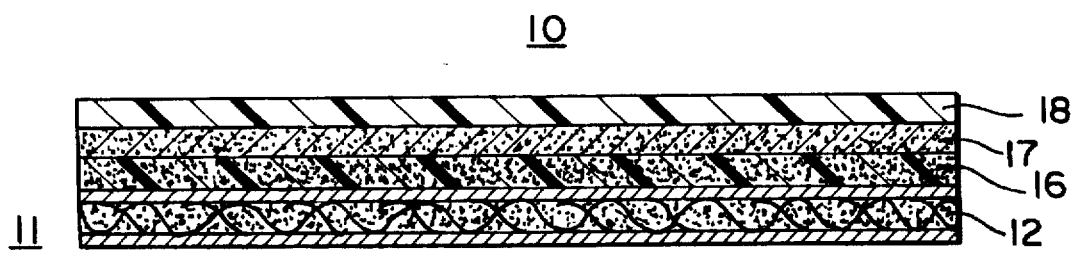

It should, of course, be understood that the description and drawings herein are merely illustrative and that various modifications and changes can be made in the structures disclosed without departing from the spirit of the invention.

DESCRIPTION OF THE PREFERRED EMBODIMENTS

When referring to the preferred embodiments, certain terminology will be utilized for the sake of clarity. Use of such terminology is intended to encompass not only the described embodiment, but also technical equivalents which operate and function in substantially the same way to bring about the same result.

Referring now more particularly to the drawing and the one embodiment of an electrochemical cell such as a battery 10 therein illustrated, which incorporates the current collector therein. The battery cell 10 as shown is of the flat type which can be of alkaline or alkaline earth metal.

Alkali metal-polymer electrolyte batteries such as alkaline metal, or alkaline earth metal or lithium-ion type batteries, consist of at least an anode or negative electrode, an ion-conductive polymer electrolyte layer, and a cathode or positive electrode. Such batteries can be of virtually any desired size and configuration, and usually include additional layers such as current conduction backing layers, insulating layers and connection layers.

For purposes of illustration, the battery 10 to be described is of the lithium metal type, but other alkaline metals or alkaline earth metals or lithium-ion type can be used if desired. The battery 10 includes a base 11 which acts as a current collector for the battery.

The base 11 includes a fibrous net 12 of carbon or graphite which has been coated with a suitable metal 14 such as copper, nickel, aluminum or stainless steel. It should be noted that copper and aluminum are preferred coatings for lithium-ion batteries.

The coating 14 is preferably done by vacuum deposition onto the net 11 in a thickness of a trace amount up to ten (10) microns, but the coating methods that adhere thin metal coats are also useful.

The coating 14 is such that the individual fibers are coated, but the voids between the fibers are not affected, which voids can hold active materials if deposited therein.

The choice of the thickness of the fibrous net and the metallic coating 14 is dependent upon the specific current collecting capabilities required by the device in which the collector is incorporated.

If the base current collector 11 is to be used for a cathode, then it may be coated by additional layers 16 of a cathodic composition of well known type, which may contain finely ground particles of an intercalation compound, such as vanadium oxide compound ($V_6O_{13}$), mixed with an organic solvent, polymer binder, alkali salt, and carbon black.

The resultant cathode has the base current collector 11 embedded in the described composition matrix. Additional layers may be applied to form the complete device. The layer 16 may have a layer 17 of polymeric electrolyte applied thereto, which may be a thin layer of polyethylene oxide compounded with a lithium salt.

The layer 17 may have an anodic layer 18 applied thereto, which may be an alkali metal foil or alkali metal alloy foil, or other layers as required.

For alkali metal-ion type batteries such as lithium-ion batteries, the cathode can be constructed using the current collectors of this invention, and intercalation compounds such as lithiated oxides of nickel, cobalt, or manganese compounded with a polymer binder, lithium salt and carbon black. In addition, insertion anodes such as pyrolitic carbons or graphites can also be constructed using the lightweight current collectors of this invention. This will result in a very lightweight battery of high energy density when compared to a similar battery using metal current collectors for both the anode and cathode.

EXAMPLE

A. A sheet of non-woven carbon fiber fabric having a thickness of 4 mils was cut to the dimensions 1.5×4 inches.

B. An identical sheet of the same dimensions and material was metallized with copper 3500 Angstroms thick by vacuum vapor deposition or sputtering on both sides. The ohmic resistance of both samples individually was measured from edge to edge through approximately 4 inches of the length of the samples. Sample A was 65 ohms; Sample B was 1.1 ohms which is approximately 59 times less resistive or more conductive than Sample A.

It will thus be seen that structures have been provided with which the objects of the invention are achieved.

We claim:

1. A high energy density alkali metal cell which includes an anode, an electrolyte, and a cathode having current collecting base means, the improvement which comprises said cathode base current collecting means is a fibrous net of carbon or graphite with a coating of metal only on the fibers, and adhering to said fibers, with voids between the fibers which can hold active materials if deposited therein.

2. A high energy density alkali-metal ion cell which includes an anode, an electrolyte, a cathode, and having current collecting base means, the improvement which comprises at least one of said anode and cathode base current collecting means is a fibrous net of carbon or graphite with a coating of metal only on the fibers, and adhering to said fibers, with voids between the fibers which can hold active materials if deposited therein.

3. A high energy density cell as defined in claim 2 in which said alkali metal-ion cell is a lithium-ion cell.

4. A high energy density cell as defined in claim 1, 2 or 3 in which, said current collector is part of said cathode and an additional coating of active material is provided on said net.

5. A high energy density cell as defined in claim 1 in which, said current collector is part of said anode.

6. A high energy density cell as defined in claim 2 or 3 in which said current collector is part of said anode, and an additional coating of active material is provided on said net.

7. A high energy density cell as defined in claim 1, 2 or 3 in which, said metal coating is of aluminum.

8. A high energy density cell as defined in claim 1, 2 or 3 in which, said metal coating is of copper.

9. A high energy density cell as defined in claim 1, 2 or 3 in which, said metal coating is of nickel.

10. A high energy density cell as defined in claim 1, 2 or 3 in which, said metal coating is of stainless steel.

* * * * *